United States Patent [19]
Sinclair et al.

[11] Patent Number: 6,084,403
[45] Date of Patent: *Jul. 4, 2000

[54] SLIM-HOLE COLLAR LOCATOR AND CASING INSPECTION TOOL WITH HIGH-STRENGTH PRESSURE HOUSING

[75] Inventors: Paul L. Sinclair; Joseph K. Clontz, both of Austin, Tex.

[73] Assignee: Cedar Bluff Group Corporation

[*] Notice: This patent issued on a continued prosecution application filed under 37 CFR 1.53(d), and is subject to the twenty year patent term provisions of 35 U.S.C. 154(a)(2).

[21] Appl. No.: 08/829,169

[22] Filed: Mar. 31, 1997

[51] Int. Cl.[7] .............................. G01V 3/28; G01B 7/06; G01N 27/72
[52] U.S. Cl. ..................... 324/221; 324/339; 324/368; 324/233; 166/255.1
[58] Field of Search .................................... 324/221, 233, 324/339, 220, 326, 368; 166/250, 255.1, 65.1, 64, 254.1; 73/151; 340/854.2; 364/422; 250/256; 367/35; 181/105

[56] References Cited

U.S. PATENT DOCUMENTS

| | | | |
|---|---|---|---|
| 2,476,137 | 7/1949 | Doll | 324/368 |
| 3,396,786 | 8/1968 | Schuster et al. | 166/255.1 |
| 4,067,386 | 1/1978 | Weise | 166/64 |
| 4,292,589 | 9/1981 | Bonner | 324/221 |
| 4,451,789 | 5/1984 | Meador | 324/338 |
| 4,472,680 | 9/1984 | Wellington | 324/221 |
| 4,540,941 | 9/1985 | Walkow | 324/221 |
| 4,553,097 | 11/1985 | Clark | 324/338 |
| 4,587,423 | 5/1986 | Boyce | 250/269 |
| 4,661,700 | 4/1987 | Holenka | 250/267 |
| 4,744,030 | 5/1988 | Carlson et al. | 324/221 |
| 4,808,925 | 2/1989 | Baird | 324/221 |
| 4,825,073 | 4/1989 | Smith, Jr. et al. | 250/260 |
| 5,065,099 | 11/1991 | Sinclair et al. | 324/339 |
| 5,361,838 | 11/1994 | Kilgore | 324/221 |
| 5,410,152 | 4/1995 | Gadeken | 250/260 |
| 5,426,367 | 6/1995 | Martin et al. | 324/221 |
| 5,429,190 | 7/1995 | Kilgore et al. | 166/255 |

FOREIGN PATENT DOCUMENTS

| | | | |
|---|---|---|---|
| 2158245 | 11/1985 | United Kingdom | 324/221 |

OTHER PUBLICATIONS

Schmidt, The casing Inspection Tool—An Instrument for The In–Situ Detection of External Casing Corrosion in Oil Wells, Jul. 1961.

*Primary Examiner*—Jay Patidar
*Attorney, Agent, or Firm*—Skjerven, Morrell, MacPherson, Franklin, & Friel, L.L.P.

[57] ABSTRACT

An inductive collar locator tool is provided that provides improved sensitivity and precision in locating collars and other discontinuities in a casing string. In a preferred embodiment, the collar locator includes a transmitter coil that produces an oscillating magnetic field, which couples to the casing string proximate the tool. The tool also includes a pair of spaced receiver coils connected to signal processing circuitry which provides an output signal representing the difference in the phase of the magnetic field detected by the receiver coils. The phase difference is relatively constant when the tool is in plain casing pipe, but it changes rapidly when the tool passes through pipe that includes discontinuities, such as joints or collars. The collar locator tool may include an on-board oscillator and digital signaling capabilities. The collar locator is preferably enclosed in a titanium pressure housing that is adapted for through-tubing operations.

26 Claims, 7 Drawing Sheets

SLIM-HOLE COLLAR LOCATOR AND CASING INSPECTION TOOL WITH HIGH-STRENGTH PRESSURE HOUSING

FIELD OF THE INVENTION

This invention relates to the field of logging and inspecting oil and gas wells. More particularly, the invention is an inductive casing collar locator tool, which may also be useful as a casing inspection tool.

BACKGROUND OF THE INVENTION

Casing collar locator tools are instruments used in logging operations in boreholes that are cased with metal pipe (typically ferromagnetic steel) to provide structural support for the borehole, to ensure that subsurface fluids such as water, oil and gas do not enter the wellbore from undesired formations or escape into underground rock formations. It is very important in such logging operations to be able to ascertain the exact depth of various tools that are used in production operations, and a collar locator is typically used to count the total number of lengths of casing traversed in the descent down the borehole by a string of tools from the wellhead (located at ground level) to a desired depth in the wellbore.

Prior art casing collar locator tools are used to determine the locations of the joints between sections of steel casing, where a steel "collar", or threaded pipe typically of larger diameter than the casing, is screwed to the adjacent ends of both pieces of casing being connected. A standard prior art collar locator tool uses the principal of Faraday induction, employing a strong magnet to generate a magnetic field and a coil in which a voltage is induced due to the motion of the coil through the magnetic field perturbation caused by the magnetic discontinuity created by the gap between two sections of casing. These prior art "collar locators" are actually casing joint locators - they detect the gap between sections of casing, not the presence of a collar.

The primary problems with these prior art tools are: 1) they are typically speed-dependent, in that the amplitude of the received signal is proportional to the speed at which the tool is being pulled through the bore hole. It is often desirable, however, to log relatively slowly in order to get good depth resolution. Slow logging may also be desirable for other sensors in the tool-string as well, but it makes determining the location of collars more difficult when permanent magnet tools are used. 2) "Flush-joint" collars, which are specially designed casing joints that reduce the casing gap essentially to zero, and which have an inside diameter that matches that of the casing pipe, are difficult to detect using typical prior art casing collar locators because there is no "gap" between sections of casing pipe. 3) It is often desirable to centralize the tool string in the casing, because many types of tools that may be used with a collar locator must be centralized. However, many prior art collar locators must be decentralized (pressed against the wall of the casing) to work properly, or they provide the worst signal-to-noise ratio if they are centralized due to the large gap separating the locator tool from the casing wall. 4) Typical prior art casing collar locators include powerful permanent magnets to induce magnetic fields in the casing. These permanent magnets often suffer demagnetization when exposed to harsh conditions in a bore hole, and they also present a handling and safety hazard due to their tendency to pick up magnetic "trash."

Many attempts have been made to try to resolve these problems with prior art collar locators, such as adding sensitive electronic amplifiers to increase the signal level, and using multiple coils disposed to improve depth resolution, but none of the known prior art methods are able to solve all of the problems simultaneously. Accurate and reliable detection of the location of flush joint collars remains an unsolved problem in the industry that is not addressed by prior art collar locators.

SUMMARY OF THE INVENTION

The present invention addresses deficiencies in the prior art by providing a high definition, highly reliable method of locating casing joints and collars (and other discontinuities in a casing string) using a novel approach that is described herein. Rather than using a permanent magnet to create a stationary magnetic field as in the prior art, a preferred embodiment of the present invention employs a transmitting coil to generate an oscillating magnetic field and a pair of receiver coils spaced from the transmitter coil to detect the magnitude and phase of the magnetic field. In presently preferred embodiments, the distance between the transmitter coil and the first receiver coil is approximately eleven inches (11") while the distance from the first receiver coil to the second receiver coil is approximately two inches (2"). Electronic circuits are provided in the tool to generate an oscillating current to energize the transmitter and to amplify, filter and process the received signal. Additional electronic circuits measure the phase difference between the amplified and filtered received signals, convert the phase difference to a digital representation, and transmit the phase difference data to recording and display equipment located above ground level.

It can be shown by application of Maxwell's equations, or by consideration of the phenomenon of "skin-effect" in conductive and ferromagnetic media, that the phase-shift of an electromagnetic wave traveling along a tubular casing made of magnetic material is a linear function of distance along the casing and is proportional to the thickness of the casing over any unit of distance. Thus, the phase-shift of the magnetic field detected by, and thus the voltages induced in, the two receivers provides an indication of the local thickness of casing metal located proximate the two receivers. This system, therefore, senses the presence of casing collars or any other local disturbance in casing thickness, even if there is no "gap" between the ends of adjacent sections of pipe. Since the physical phenomenon of "skin-effect" is dependent on the product of the electrical conductivity and the magnetic permeability of a medium, as well as its thickness, it follows that the collar locator tool according to this invention is sensitive to any variations in these properties, as well as the presence of a collar. This is, however, not a significant problem in typical use because variations in these properties typically lie in a narrow range for typical casing steels, and they tend to be reasonably constant in each given piece of casing. Any variation that may occur from one piece of casing to the next aids in distinguishing more clearly the joints between the casing pieces. Furthermore, other variations that occur in the log trace can provide useful information to those skilled in the art of log interpretation to indicate possible damage to or deformation of the casing that may require remedial action.

Preferred embodiments of the present invention present a signal to the user that represents the phase difference between the signal received by the two receiving coils, rather than an absolute value of field phase or amplitude. This permits the tool to be constructed with high sensitivity to changes in the condition or structure of the casing string without concern for other factors that might effect the absolute value of the received signal, such as casing size and condition and other environmental factors. The collar locator of this invention additionally solves the problem of locating flush-joint collars, because it senses the collar mass itself, and is not affected by the presence or absence of any gap between casing sections or any geometrical changes at the interior wall of the casing. The present invention actually operates best when centered in the casing, because this maximizes the proportion of the signal derived from the casing, although the effect is small and the tool will also operate satisfactorily when it is not centralized. There are no permanent magnets in the tool of this invention, thereby avoiding the problems associated with such magnets. The collar locator tool operates well at any logging speed and even provides a useful signal when completely stationary. The depth resolution of the tool is determined by the distance between the two receiver coils. In typical applications using the preferred embodiment described herein, resolution of better than one inch (1") has been attained.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments of the invention which are illustrated in the appended drawings, which drawings form a part of this specification.

It is noted, however, that the appended drawings illustrate only exemplary embodiments of the invention and are, therefore, not to be considered limiting of its scope, for the invention may admit to other equally effective embodiments.

DETAILED DESCRIPTION OF A PREFERRED EMBODIMENT

Figure 1:
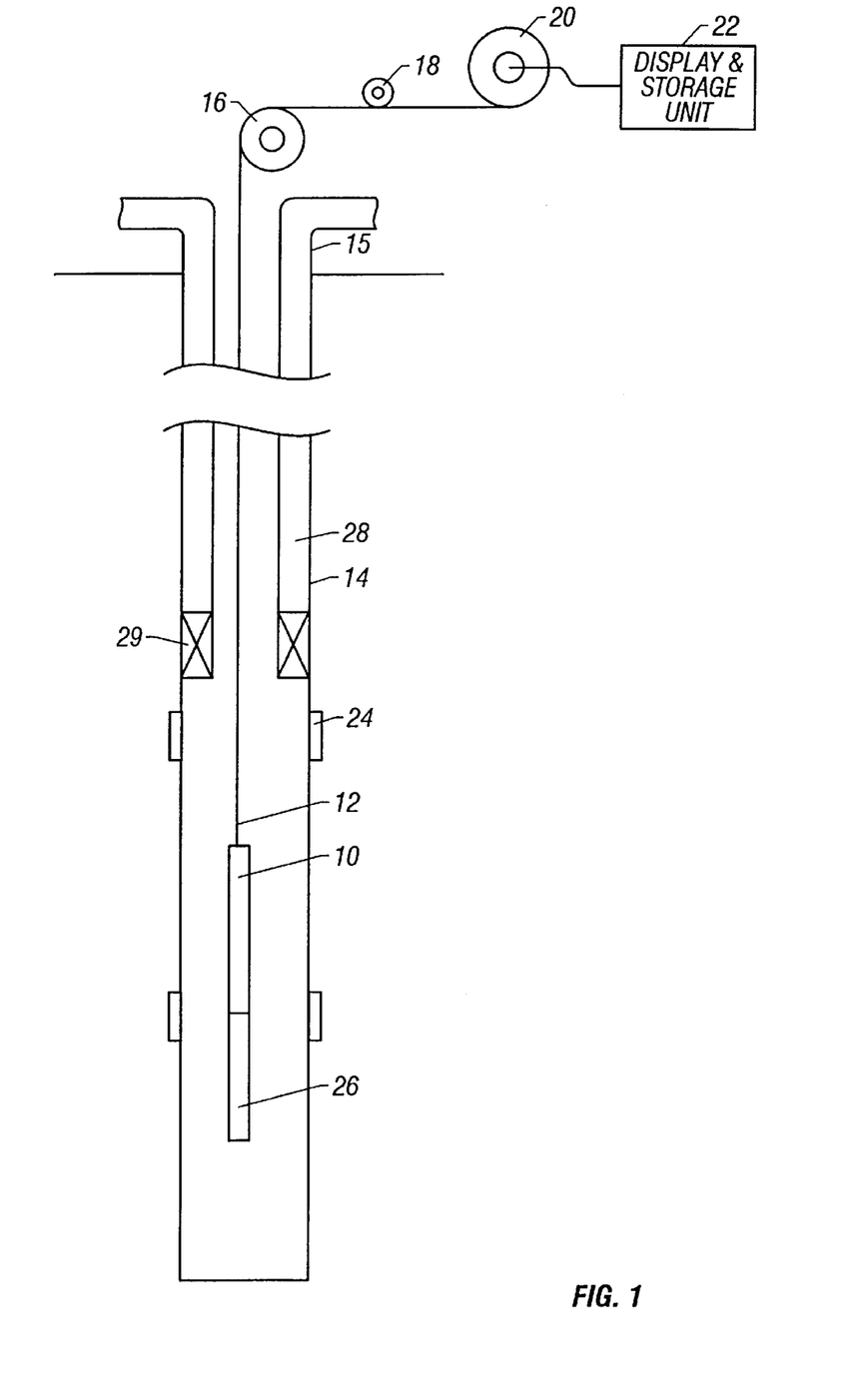
FIG. 1 is a schematic illustration of a logging system including a collar locator according to the present invention.

FIG. 1 illustrates a typical operating environment for a collar locator tool as disclosed herein. Collar locator tool 10 is operatively coupled to wireline 12 which provides electrical connectivity, as well as mechanical suspension, for tool 10. Wireline 12 and tool 10 extend within casing string 14 to a desired depth within the wellbore. Wireline 12, which may include one or more electrical conductors, exits wellhead 15, passes around pulley 16, engages odometer 18, and is reeled onto winch 20, which is employed to raise and lower the tool assembly in the wellbore. The electrical signals from wireline 12 are conducted from winch 20 to display and storage unit 22 where the signals are processed, and the information contained therein is displayed for an operator to observe and stored for future processing and reference. Display and storage unit 22 also contains apparatus for supplying control signals and power to the downhole tool assembly. The illustrated elements of a typical logging system are generally well known in the art and are not described in detail here.

A typical casing string 14 extends from wellhead 15 at or above ground level to a selected depth within a wellbore. Casing string 14 comprises a plurality of joints or segments of casing, each segment being connected to the adjacent segments by a threaded collar 24. The ends of each segment of casing are externally threaded, and collar 24 is internally threaded to mate with the threaded portion of the casing. When two pieces of casing pipe are joined with a collar, there may be a small gap between the adjacent ends of the two sections of casing. In so called "flush joint" casing, there is no gap between the two ends of adjacent sections which are held in abutting relationship by collar 24. In many applications, collar locator tool 10 is used in conjunction with another wireline tool, generically indicated as 26. The other wireline tool may be, for example, a perforation tool for cutting holes in the casing at a desired location, or a tool that senses geological formation characteristics to allow correlation between the location of casing collars and the geologic formations through which the wellbore penetrates.

FIG. 1 also shows a typical tubing string 28, which is positioned inside of casing string 14 extending part of the distance down wellbore. A packer 29 typically seals the lower end of the tubing-casing annulus and secures the lower end of the tubing string 28 to the casing. Preferred embodiments of the collar locator tool of this invention are dimensioned so that they can be lowered into the wellbore through the tubing, thus avoiding the difficulty and expense associated with pulling the tubing out of the well. Ordinarily, tools that are intended to be passed through the tubing (so-called slim-hole tools) are less than 2¼ inches in diameter, as are preferred embodiments of the present invention.

In many modern logging systems a digital telemetry system is employed, wherein a single electrical circuit is used to both supply power to the downhole tools and to transfer data between display and storage unit 22 and downhole tools 10, 26. In preferred embodiments of the present invention, a DC. voltage is provided to the tool by a power supply located above ground level, and data is coupled to the DC. power conductor by a baseband current pulse system, as is known in the art. Alternatively, the tools may be powered by batteries located within the tool assembly, and/or the data provided by the tools may be stored within the tool assembly, rather than transmitted to the surface during logging.

Figure 2:
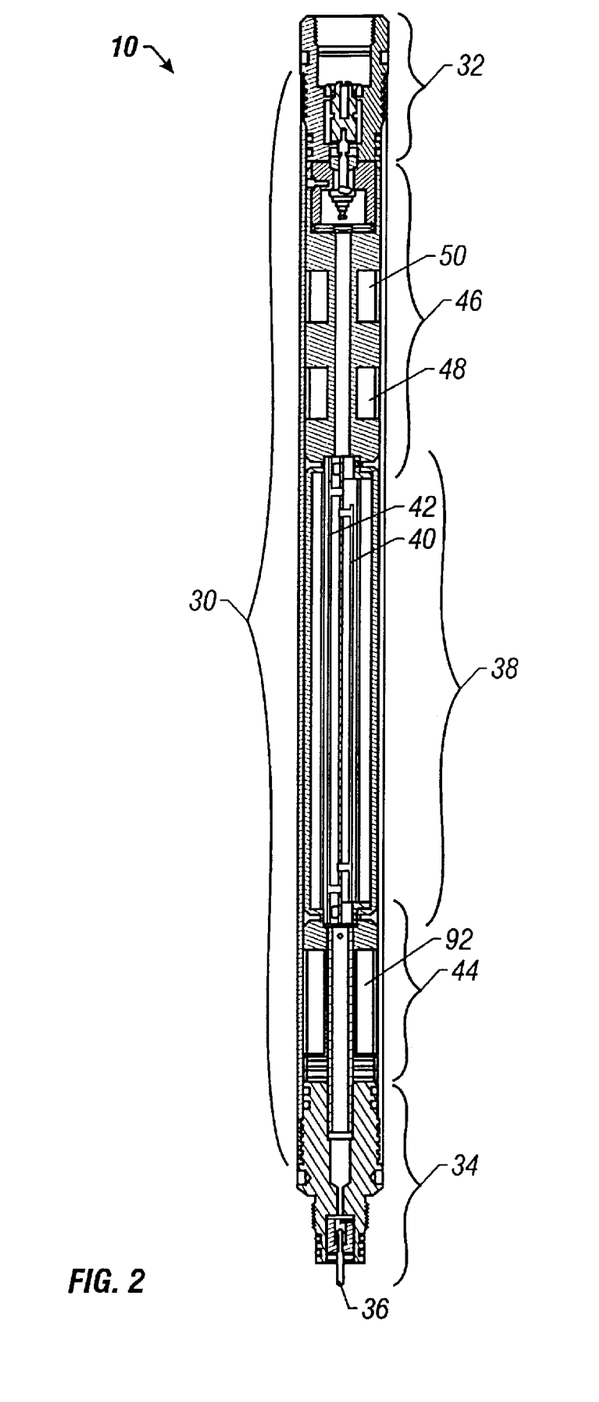
FIG. 2 is a cross-section of an inductive collar locator tool according to a preferred embodiment of the present invention, showing the major components and sections of the tool.

FIG. 2 illustrates a preferred embodiment of the induction collar locator tool, according to the present invention, showing in cross section the major sections of the tool. The operating components of the tool are disposed within pressure housing 30, which is a tubular member, internally threaded at both ends, and which is preferably constructed of a high strength, high resistivity, non-magnetic material, such as titanium. The function of the pressure housing 30 is to protect the internal working components of the tool from the fluids and pressures that may be encountered in subsurface logging operations. In the presently preferred embodiments of the invention, pressure housing 30 is constructed of titanium, which is adequate to protect the tool from the pressures encountered in logging operations, and which does not interfere with the magnetic fields generated and detected by the tool. Alternatively, pressure housing 30 could be constructed of a material such as fiberglass, which would not interfere with the magnetic fields which are emitted and detected by this tool. A fiberglass housing, however, does not have the inherent rigidity necessary to withstand wellbore pressures, and must generally be internally pressurized in order to perform its required functions.

In preferred embodiments, the outside diameter of the collar locator tool 10 is less than 2.75 inches, which makes it suitable for through-tubing use and other slim-hole applications. This invention is suitable for implementation in larger diameter tools as well.

At the top end of pressure housing 30 is top subassembly ("top sub") 32, which is typically threadably connected to pressure housing 30 to form a leak-proof seal that is designed to withstand anticipated wellbore conditions. The main function of top subassembly 32, in addition to sealing the top of pressure housing 30, is to provide an electrical connection into the working components of the induction collar locator tool 10. Bottom subassembly ("bottom sub") 34 is threadably connected to the bottom end of pressure housing 30, as illustrated, also forming a leak-proof seal at the bottom of the tool that is designed to withstand wellbore conditions. In the illustrated embodiment, top sub 32 and bottom sub 34 comprise industry-standard mechanical and electrical connections which permit tools to be joined to one another and for connecting the tools to the wireline 12. Top sub 32 includes the female portion of a single pin electrical connector and bottom sub 34 includes the male portion of the connector. In this illustrated embodiment, there is a single signal conductor of which pin 36 forms a part. A ground return path is also provided through the connector arrangement, which is well known in the art.

The primary operating sections of the illustrated preferred embodiment will now be identified. Electronic chassis 38, which is located in the central part of the tool, includes analog printed circuit board 40 and digital printed circuit board 42. The electrical connection to the wireline, which is received through top subassembly 32, is routed to the printed circuit boards which contain circuitry that controls the operation of the tool and the input/output functions necessary for communication with display and storage unit 22 at the surface, as well as with other tools that may be included in the tool-string being operated. Transmitter coil section 44 includes coil 92, which generates a magnetic field, as well as other components for supporting the coil and for shaping the magnetic field which is produced. Receiver coil section 46 includes first receiver coil 48 and second receiver coil 50, which detect the magnetic field and provide signals to the electronic circuitry in the tool, which are processed to generate a signal indicating the presence of casing collars or other perturbations in the detected magnetic fields. Each of these sections of the tool is discussed in further detail in connection with FIGS. 3A and 3B, below.

Figure 3A:
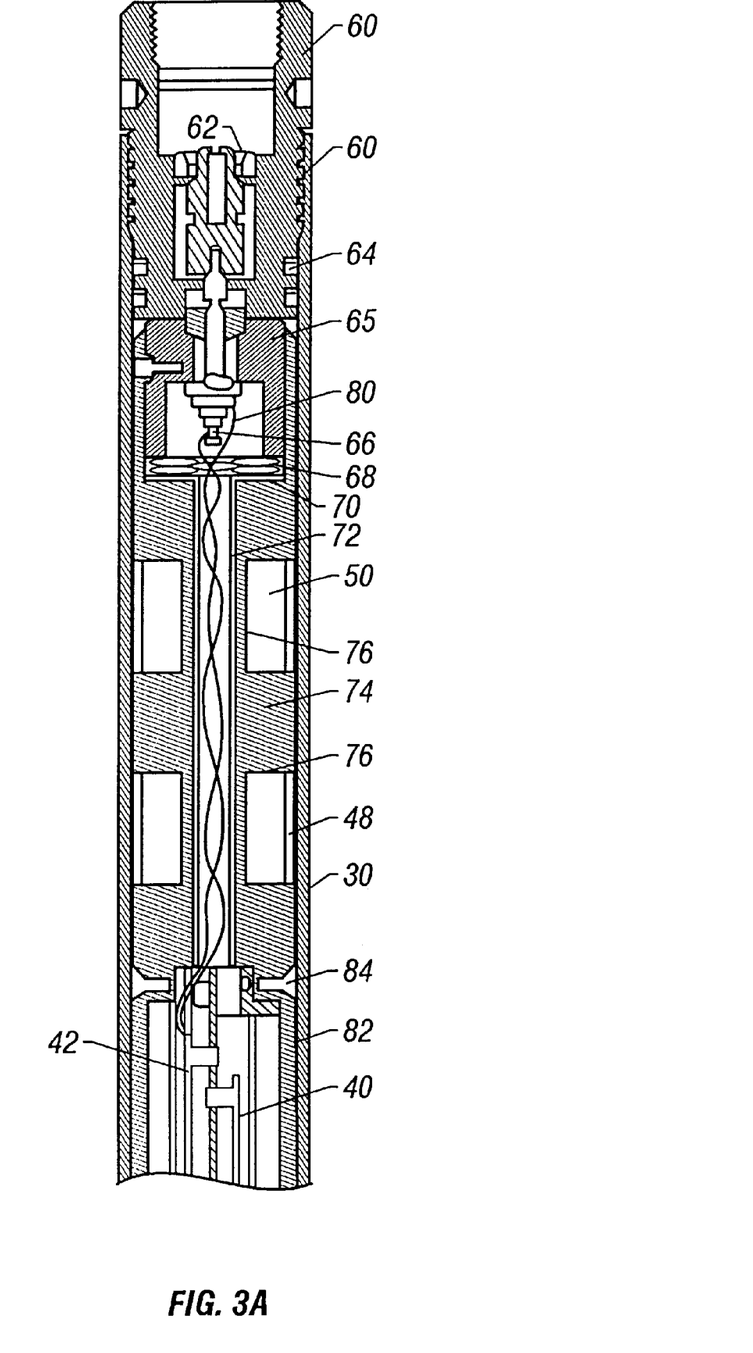
FIGS. 3a and 3b are detailed mechanical cross sections of the top half and the bottom half, respectively, of a preferred embodiment of the present invention.

Turning now to FIG. 3A, a preferred embodiment of the induction collar locator tool according to this invention is illustrated. Top subassembly 60 is threadably engaged with pressure housing 30, and "O" rings 64 are provided for ensuring a leak-proof seal. Top subassembly 60 includes female single pin connector 62 as is known in the art. The electrical signals coupled through female single pin connector 62 are conducted to signal post 66, from which they are conducted by top signal wire 78 to digital printed circuit board 42 through a longitudinal concentric orifice formed in receiver bobbin 74. The electrical ground connection between female connector 62 and the printed circuit boards 40–42 comprises top sub 60, contact block 65, and top ground wire 80 which extends through the orifice in receiver bobbin 74. Bellville spring 68 is positioned between contact block 65 and receiver bobbin 74 so as to bias contact block 65 into firm contact with top sub 60 in order to establish a good electrical path for the ground return. Between Bellville spring 68 and receiver bobbin 74, a grounded brass disc having a central orifice defined therein (in the shape of a washer) is provided in order to shield receiver coils 48, 50 from electromagnetic fields which may be generated in the connector portion of the assembly.

Receiver bobbin 74 may be constructed of high temperature fiberglass or other materials that are thermally stable at wellbore temperatures. Receiver bobbin 74 has a concentric longitudinal orifice defined therein, through which top ground wire 80 and top signal wire 78 are routed. In preferred embodiments, brass liner 72, in the form of a tube, is inserted into the longitudinal orifice in receiver bobbin 74 in order to shield the receiver coils 48, 50 from electromagnetic fields that may be generated by top signal wire 78 and top ground wire 80 as they pass through said orifice.

First receiver coil 48 comprises a plurality of turns of insulated magnet wire that are wound around receiver bobbin 74 in the groove provided. In preferred embodiments, a layer of high permeability magnetic material, such as MUMETAL foil, is placed in the groove beneath first receiver coil 48 in order to increase the sensitivity of the coil. In the presently preferred embodiment, first receiver coil 48 comprises about 14,000 turns of 39-gauge magnetic wire having high temperature insulation. Second receiver coil 50 also comprises magnet wire wound around receiver bobbin 74 in the groove provided, with a layer of high permeability magnetic material wrapping the bobbin in the groove beneath the coils of magnet wire. In a preferred embodiment, second receiver coil comprises about 19,100 turns of 39-gauge magnet wire having high temperature insulation. The spacing between first receiver coil and second receiver coil may be about two inches (2"), but that spacing may be varied depending on the design choices made for a particular tool constructed according to this invention.

Contact block 65 is receivably disposed within an upper portion of receiver bobbin 74 and held in place by set screw 61. Set screw 61 allows a limited amount of longitudinal motion between contact block 65 and receiver bobbin 74. Contact block 65 is biased in an upward direction relative to receiver bobbin 74 by Bellville spring 68, which ensures solid contact between a top surface contact block 65 and a bottom surface of top sub 60 when the tool is assembled, providing a good ground current path between contact block 65 and top subassembly 60.

Electronics chassis 82 is a rigid structure designed to operably support analog printed circuit board 40 and digital printed circuit board 42, and to provide structural support between the receiver and transmitter portions of the tool. Electronics chassis 82 is constructed of an aluminum alloy in the presently preferred embodiment. Electronics chassis 82 is rigidly connected to receiver bobbin 74 by screws 84 and to transmitter bobbin 90 by screws 88 (see FIG. 3B).

Figure 3B:
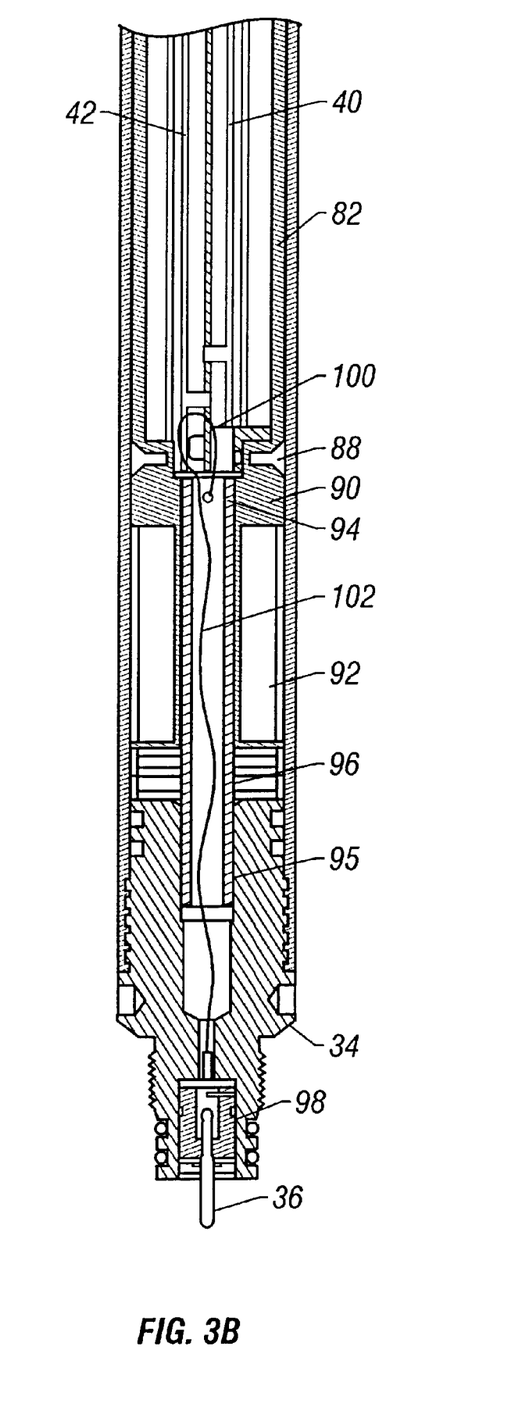

FIG. 3B is a cross-sectional view of the bottom half of an induction locator collar tool, in accordance with a preferred embodiment of the present invention. Electronics chassis 82 and printed circuit boards 40, 42 were discussed in connection with FIG. 3A. Bottom signal wire 102 connects the printed circuit boards to single pin connector 98 located in bottom subassembly 34 and ultimately to pin 36 which extends from the bottom end of the tool. This provides a signal connection for additional tools or circuitry which may be located below the collar locator tool in a selected toolstring. The ground connection to the bottom of the tool is from printed circuit boards 40, 42, through bottom ground wire 100, through transmitter core 92, and into the body of bottom sub 34.

Transmitter coil 92 comprises magnetic wire windings disposed in an annular groove machined in transmitter bobbin 90. In the presently preferred embodiment, transmitter coil 92 comprises 5,700 turns of 37-gauge, high temperature magnet wire. Transmitter bobbin 90 has a longitudinal concentric orifice formed therein which receives transmitter core 94. Transmitter core 94 comprises a generally tubular body of magnetic material, which is threaded at its lower end 95 for engagement with an internal threaded portion of bottom subassembly 34. In the presently preferred embodiment, the portion of transmitter core 94 above threaded portion 95 is longitudinally split to prevent formation of circumferential current paths, which could interfere with the magnetic field produced by transmitter coil 92. Pole piece 96 is disposed around transmitter core 94 beneath transmitter coil 92. Pole piece 96 is made of magnetic material and functions to shape the magnetic field produced by transmitter coil 92 into a selected configuration. Pole piece 96 may be constructed of a set of insulated iron washers, each washer being split radially from its central orifice to its outer edge to avoid formation of a current path around the washer. Bottom ground wire 100 extends from electronic circuitry on PC boards 40, 42 to a location near the top end of transmitter core 94, to which it is conductively coupled, for example by a screw. The ground path through the transmitter section thus comprises bottom ground wire 100, transmitter core 94, and bottom subassembly 34.

In the presently preferred embodiment, the transmitter coil extends 2.1 inches longitudinally, first receiver coil 48 extends 1.0 inches, and second receiver coil 50 extends 1.0 inches. There are 10.8 inches between the top of transmitter coil 92 and the bottom of first receiver coil 48, and the spacing between the top of first receiver coil 48 and the bottom of second receiver coil 50 is 1.0 inches.

Figure 4:
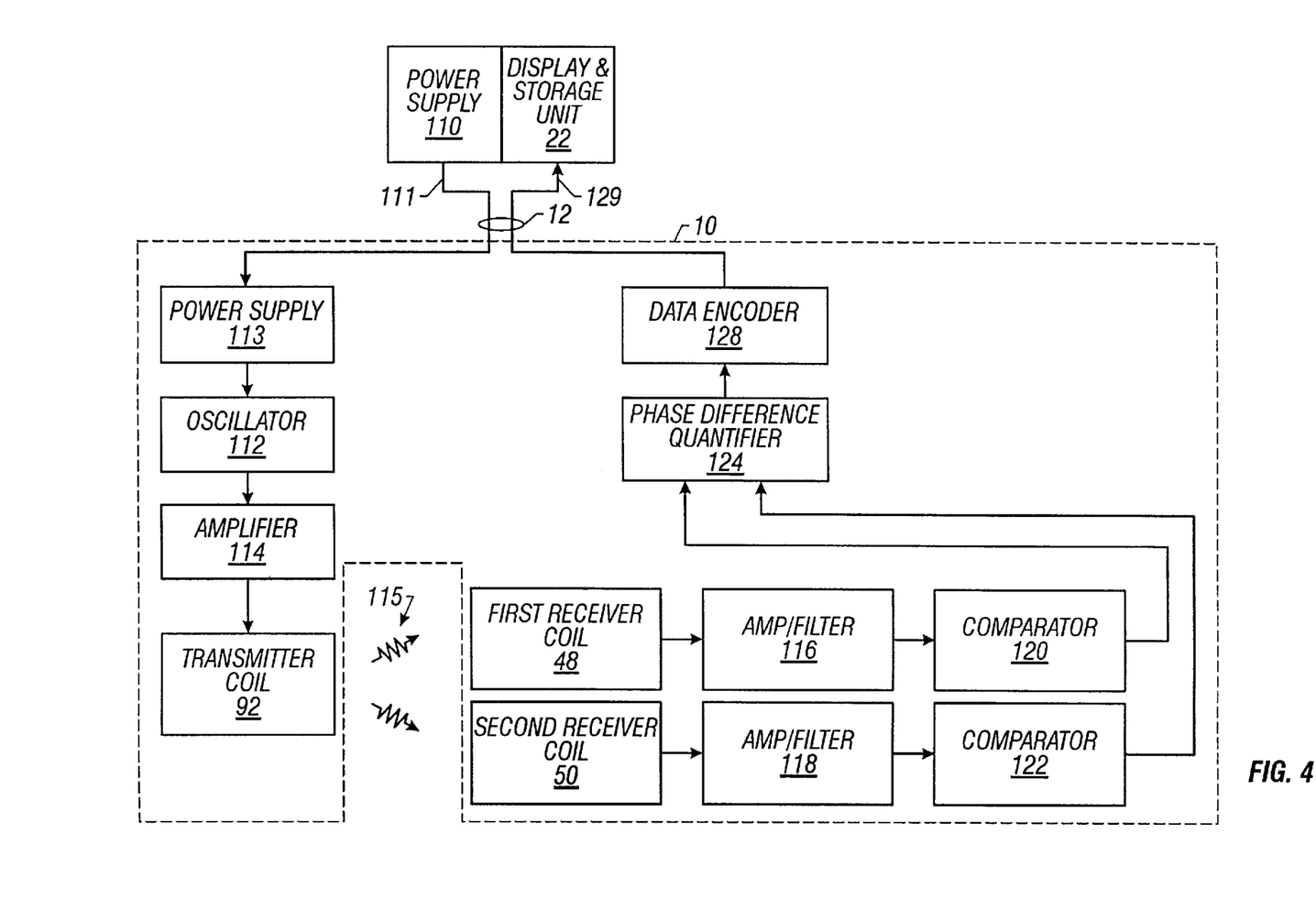
FIG. 4 is a block diagram of the circuitry in a preferred embodiment of the present invention, showing the important power, signal and data paths.

FIG. 4 shows the circuitry contained within a preferred inductive collar locator tool according to the present invention in block diagram form. The components shown in this figure are well known in the art and detailed circuits are omitted. One skilled in the art will appreciate that there are a multitude of possible implementations and modifications of this circuitry, that would take advantage of the present invention and the teachings contained herein.

Referring to FIG. 4, DC power supply 110 is generally located in the logging truck, but may alternatively be located within the tool itself or within the tool-string. Conductor 111 conveys power from DC power supply 110 to the collar locator tool to provide power to the circuitry therein. Tool power supply circuitry 113, which receives the power supply voltage from conductor 111 and provides power to the other circuits at suitable voltages, is contained on printed circuit boards 40, 42. In the presently preferred embodiment, DC power is supplied to the tool via conductor 111 at 48 volts.

In a preferred embodiment of the tool circuitry, oscillator 112 receives DC power from tool power supply 113 and produces a sine wave output at 32 Hz. Amplifier 114 is connected to oscillator 112 and to transmitter coil 92, to receive the sine wave output from oscillator 112 and to drive transmitter coil 92 with a signal having a selected frequency and magnitude. In the presently preferred embodiment of this invention, the selected transmitter driving signal is 32 Hz at about 50 volts peak-to-peak. In order for the tool to generate a suitable magnetic field for detecting the presence of casing collars, it is believed that frequencies between about 8 and 128 Hz may be used, where the specific frequency used will depend on the specific design of the tool coils and other components, and the environment in which the tool is intended to operate. In alternative embodiments, the oscillating transmitter signal may be generated in surface equipment and provided to the tool by wires contained in cable 12.

In response to the signal from oscillator 112 and amplifier 114, transmitter coil 92 produces a magnetic field 115 which radiates from the tool and which particularly couples with the magnetic material in the casing pipe and other nearby magnetic structures. First receiver coil 48 and second receiver coil 50 are located near one another, but spaced from transmitter coil 92. Oscillating voltages are induced in the receiver coils by the magnetic field that is created by transmitter coil 92. The voltages that are induced in first receiver coil 48 may be different from those induced in second receiver coil 50 due to their different positions in the magnetic field.

In the illustrated embodiment, the voltage induced in first receiver coil 48 is amplified and filtered by amplifier/filter circuit 116 and then input into comparator 120 which forms a first square wave output based on zero crossings of the amplified and filtered signal from first receiver coil 48. The voltage induced in second receiver coil 50 is processed by amplifier/filter circuit 118 and input to comparator 122, which similarly forms a second square wave output. The outputs of comparators 120 and 122 are input to digital phase difference quantifier 124, which measures and quantifies the difference in transition times between the two square wave signals arriving from comparators 120 and 122. This quantifier may be implemented by a programmed microcontroller. The resulting digital phase difference signal is output from phase difference quantifier 124 to data encoder 128, which formats the digital information for transmission via wireline cable 12 to display and storage unit 22 for analysis and recordation. Other arrangements for measuring the phase difference of the detected field may be utilized, as would be apparent to one skilled in the art.

Alternatively, receiver coils 48, 50 may provide input signals to circuitry that measures the amplitude or power of the detected magnetic field and then provides an output signal that corresponds to the difference in magnetic field amplitude detected by the receivers. Such circuitry is known in the art and is not described in detail here. Also, additional receiver coils may be provided, with associated processing circuitry, in order to provide additional information about the shape of the magnetic field.

In preferred embodiments, DC power signal 111 and data signal 129 may be multiplexed onto a single conductor for transmission between the collar locator tool and the electronic data display and storage unit 22 located above ground level, using techniques well known to those skilled in the art. For example, data signal 129 may be relayed to the surface using a baseband current pulse transmission technique. Other signaling methods may be used without departing from the scope of the invention. In the presently preferred embodiment, data encoder 128 samples the output of quantifier 124 sixteen times per second and provides information at that rate to the data display and storage unit 22, which is correlated with depth information from odometer 18. In alternative embodiments, the measured data may be stored in storage means located in the toolstring, along with correlated data from other tools, rather than being communicated to the surface in real time. The data may then be retrieved from the toolstring after it is pulled from the wellbore.

Figure 5:
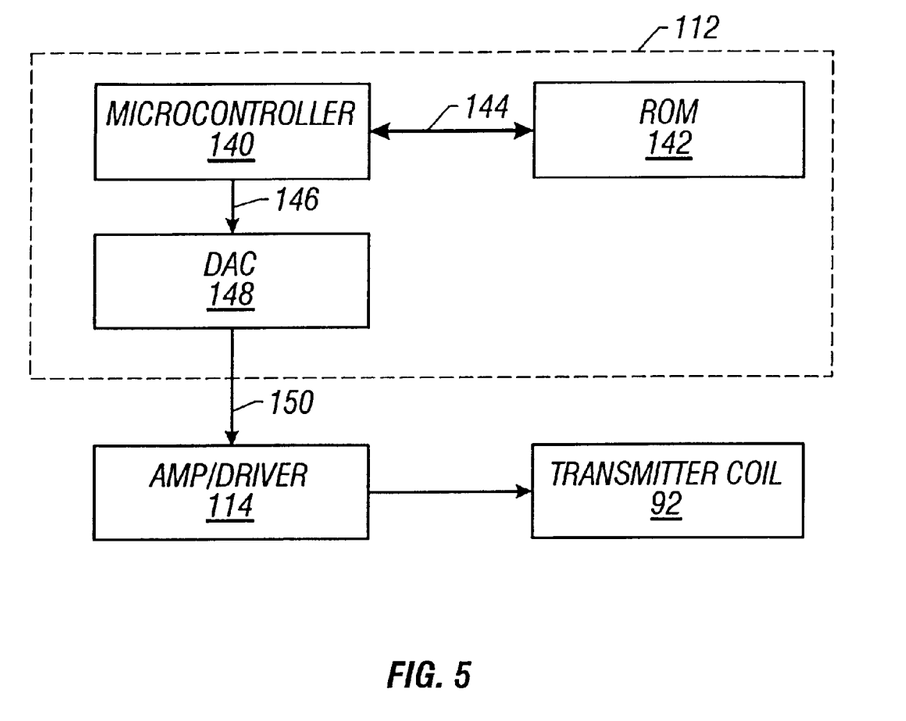
FIG. 5 is a block diagram detailing an oscillator/amplifier arrangement employed in a preferred embodiment of the present invention.

Referring to FIG. 5, a presently preferred oscillator circuit 112 will be described in further detail. Oscillator 112 includes microcontroller 140 which is connected by data bus 144 to read-only memory (ROM) 142. ROM 142 contains digital data representing a desired signal shape, such as a sine wave. Microcontroller 140 reads data from ROM 142 and provides a digital output 146 in the form of a digitized signal at a selected frequency, which is converted to an analog stepwise approximation of the selected signal by digital-to-analog converter 148. Each of these components is well known in the art. Thus, the output 150 of oscillator circuit 112 may be a step-wise approximation of a selected sine wave, which is connected to the input of amplifier/driver 114. Amplifier/driver 114 amplifies the oscillating signal to a desired energy level and provides oscillating output current 150 to transmitter coil 92. In the presently preferred embodiment, the signal presented to transmitter coil 92 is a 32 Hz sine wave having a magnitude of approximately 50 volts peak-to-peak.

Figure 6:
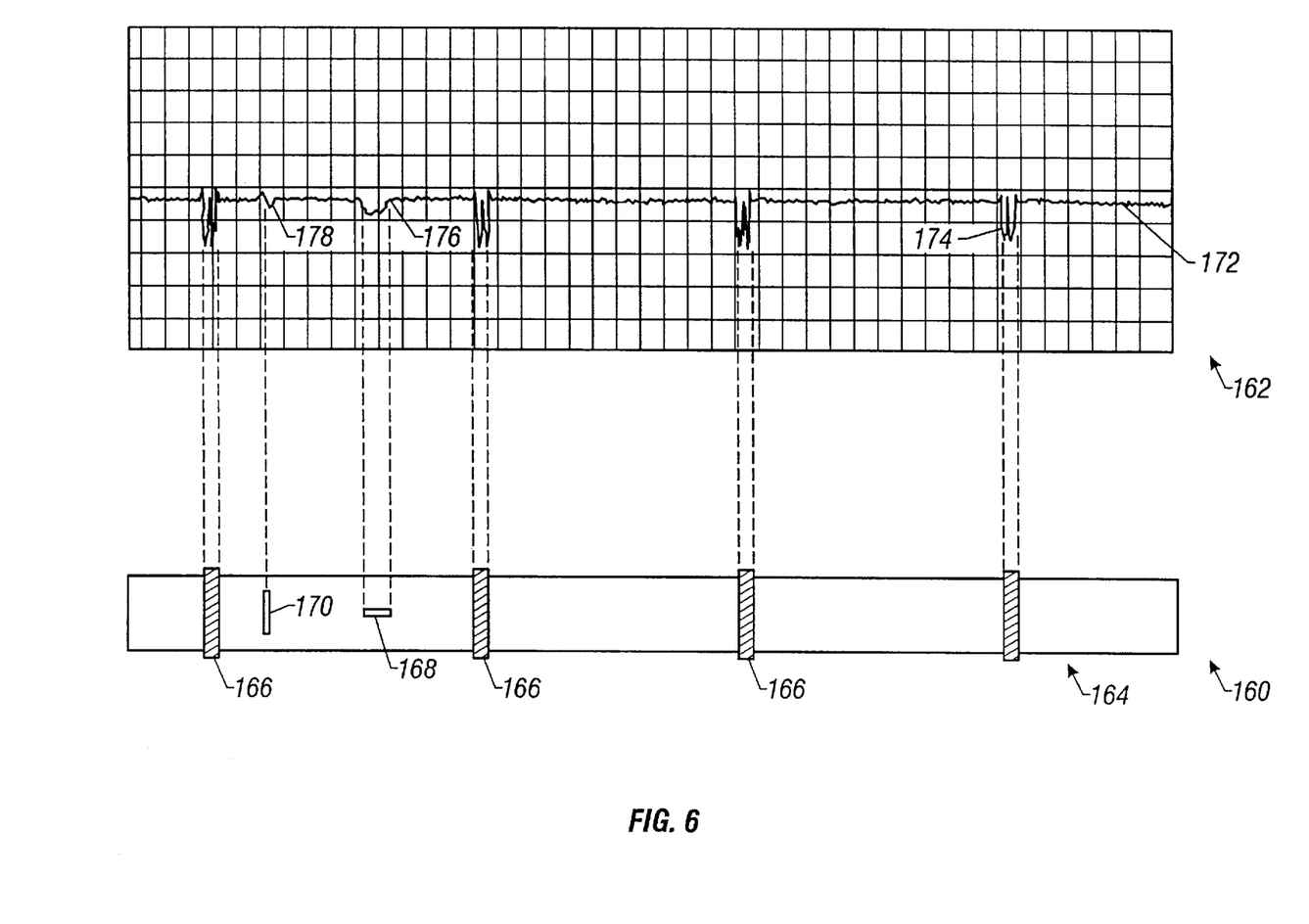
FIG. 6 illustrates a typical log trace generated using the present invention, and an elevation view of a typical casing string with collars and other features correlated to deflection features apparent on the log trace.

FIG. 6 shows a graphical display 162 generated by a collar locator tool constructed in accordance with the present invention, correlated to a drawing of the casing string 160 in which the tool was run, in order to show the trace deflections associated with various discontinuities in the casing string. Casing string 160 comprises several joints of casing pipe 164 connected to one another by collars 166. Each collar 166 is internally threaded to correspond to external threads provided on the ends of each joint of casing 164. In modem "flush-joint" casing designs, the casing and the collars are designed so that the ends of adjacent pieces of casing pipe are in abutting relation to one another when the connection is made, so that the interior surface of casing string 160 is of constant diameter and uninterrupted by gaps between pieces of casing pipe. (Many prior art collar locator tools operated by sensing the gap between pieces of casing pipe, and are therefore not suitable for use in flush-joint casing.) The illustrated casing string 160 also has a vertical crack 168 and a horizontal crack 170 disposed therein.

Log trace 172 is a representation of the measured phase difference between the magnetic fields detected by first receiver coil 48 and second receiver coil 50, as described above, plotted by depth. Display and storage unit 22 typically includes apparatus for receiving the data signal from the tool and for decoding, recording and displaying that data in strip-chart format, as is illustrated. Trace 172 shows a substantially constant value for the phase difference signal in most of casing string 160. At depths corresponding to the locations of collars, trace 172 exhibits a definite and characteristic deflection 174, corresponding to the perturbation in the magnetic field due to the increased mass of metal at the collar locations, as reflected in the phase differential detected by receiver coils 48, 50. Even in flush-joint pipe, as illustrated, the collars are easily located by the present invention.

The preferred embodiment of the induction collar locator tool also provides information about the condition of the casing, because any discontinuity in a piece of casing produces a perturbation in the local magnetic field that may be detected as a change in phase difference measured by this invention. FIG. 6 shows that casing string 160 includes vertical crack 168 and horizontal crack 170, and trace 172 exhibits deflections 176 and 178 corresponding to those discontinuities. The shape of the deflection shown on graphical display 162 may be indicative of the nature of the discontinuity in the casing, allowing a skilled interpreter to evaluate the casing condition by study of log trace 172. Thus, the present invention may also be well suited for use as a casing inspection tool as well as a collar locator tool.

Preferred embodiments of the present invention have been disclosed in this patent application. Alternative embodiments and variations to the present invention remain within the scope of this patent. For example, the principles of this invention may be employed in a tool that is optimized for casing inspection, rather than casing and collar location. In another embodiment, the ratio of the amplitudes of the magnetic fields sensed by each receiver coil may be logged, rather than the difference in phase relationships of the detected fields. In yet another embodiment, a single receiver coil may be employed, and the magnetic field sensed by that receiving coil may be analyzed for changes in phase and/or amplitude with respect to the transmitted field signal, thereby indicating discontinuities in the casing string, such as the presence of collars.

The casing collar locator tool of the present invention will operate satisfactorily in any position in the wellbore. It does not need to be centralized nor does it need to be decentralized as do many of the other collar locating approaches. Because this tool does not have to be pressed against the side of the casing string in order to detect collar locations, the present invention is less likely to hang up in the well or to experience wear, due to friction against the casing string. Furthermore, the collar locator of this invention is well suited for use in combined tool assemblies, including other tools which need to centralized.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:

1. A slim hole induction collar locator tool for detecting the location of collars in a casing string, comprising:

a transmitter coil disposed within a high-strength metallic pressure housing, the transmitter coil connected to receive an oscillating current input and to transmit an oscillating magnetic field external to said pressure housing;

a first receiver coil disposed within said pressure housing at a location spaced from said transmitter coil;

a second receiver coil disposed within said pressure housing at a position spaced from said transmitter coil and proximate said first receiver coil;

phase detection circuitry connected to said first receiver coil and to said second receiver coil;

said first and second receiver coils being constructed to detect said oscillating magnetic field and to provide corresponding signals to said phase detection circuitry;

whereby the presence of collars in the casing string are indicated by changes in the phase relationship of signals received by first receiver coil and second receiver coil;

wherein the pressure housing is dimensioned to be insertable through a tubing string operatively positioned within the casing string, such that the tool can detect the location of collars in the casing string beyond a distal end of the tubing string; and wherein the outside diameter of the pressure housing is less than 2.75 inches.

2. The tool of claim 1, further comprising an oscillator connected to the transmitter coil for providing said oscillating current input, said oscillator being disposed within said pressure housing.

3. The tool of claim 2 further comprising an amplifier operably connected between the oscillator and the transmitter coil.

4. The tool of claim 1, wherein each of the first and second receiver coils comprises a plurality of turns of insulated wire, and wherein the receiver coil that is located farthest from the transmitter coil has more turns of insulated wire than does the receiver coil that is located closest to the transmitter coil.

5. The tool of claim 1, wherein the pressure housing comprises a rigid tubular member made of a non-magnetic material.

6. The tool of claim 5, wherein the tubular member is made of titanium.

7. The tool of claim 1, wherein the first and second receiver coils are located substantially farther from the transmitter coil than from one another.

8. The tool of claim 1, wherein the phase detection circuitry comprises a first comparator connected to the first receiver coil, a second comparator connected to the second receiver coil, and a phase difference quantifier connected to said first and second comparators, the phase difference quantifier having an output providing a signal corresponding to the phase difference between the magnetic field sensed by the first and second receiver coils.

9. The tool of claim 1, wherein the oscillating field has a frequency between 8 and 128 cycles per second.

10. The tool of claim 1, further comprising high permeability magnetic material disposed within the first receiver coil and the second receiver coil.

11. A slim hole induction collar locator tool for detecting the location of collars in a string of tubular goods, comprising:

transmitter means for creating an oscillating magnetic field;

first receiver means for detecting a characteristic of said magnetic field at a first location;

second receiver means for detecting a characteristic of said magnetic field at a second location, the second location being spaced from the first location;

phase comparison means for providing a signal representing a difference between the characteristic of said magnetic field at said first location and the characteristic of said magnetic field at said second location and a high strength metal pressure housing that encloses the transmitter means, the first receiver means and the second receiver means, the pressure housing being dimensioned to be insertable through a tubing string such that the tool can detect collars in a casing string located beyond a distal end of the tubing string, wherein the outside diameter of the pressure housing is less than 2.75 inches.

12. The tool of claim 11, wherein the characteristic is the phase of the magnetic field.

13. The tool of claim 11, wherein the characteristic is the amplitude of the magnetic field.

14. The tool of claim 11, wherein the transmitter means, the first receiver means, the second receiver means, and the phase comparison means are all disposed within a generally cylindrical pressure housing.

15. The tool of claim 11, wherein said first receiver means comprises a first receiver coil and a high permeability magnetic material disposed within said first receiver coil.

16. The tool of claim 11, wherein said second receiver means comprises a second receiver coil and a high permeability magnetic material disposed within said second receiver coil.

17. A method for detecting the location of collars in a casing string located beyond a distal end of a tubing string while the tubing string is operatively positioned within the casing string, comprising:

providing a slim hole collar locator tool comprising a transmitter and at least two receivers, the collar locator tool being enclosed by a high strength metallic pressure housing with an outside diameter of less than 2.75 inches;

placing the collar locator tool into the casing string beyond the distal end of the tubing string by passing the tool through the tubing string;

generating an oscillating magnetic field using the transmitter at a selected location in the tubing string;

detecting a selected characteristic of said oscillating magnetic field using a first receiver located at a first location spaced from said selected location;

detecting the selected characteristic of said oscillating magnetic field using a second receiver located at a second location spaced from said selected location and spaced from said first location;

comparing the selected characteristic at the first location to the selected characteristic at the second location; and providing an output signal representing the result of the comparison, the output signal being indicative of the presence or absence of a collar proximate the first and second locations.

18. The method of claim 17, wherein the selected characteristic is the phase of the magnetic field.

19. The method of claim 17, wherein the selected characteristic is the amplitude of the magnetic field.

20. The method of claim 17, further comprising displaying the output signal in strip-chart format as a function of distance along the string of tubular goods.

21. The method of claim 17, wherein the frequency of the magnetic field is between 8 and 128 cycles per second.

22. A slim hole induction logging tool for detecting discontinuities in a string of tubular goods, comprising:

a rigid high strength metal pressure housing less than 2.75 inches in diameter and sufficient to withstand wellbore conditions, the pressure housing being insertable through a string of tubing operatively positioned in a wellbore;

a transmitter disposed within the pressure housing and adapted to generate an oscillating magnetic field;

a first receiver disposed within the pressure housing and positioned to detect the oscillating magnetic field at a first location;

a second receiver disposed within the pressure housing and positioned to detect the oscillating magnetic field at a second location;

a comparator disposed within the pressure housing and connected to the first receiver and to the second receiver, said comparator providing an output signal corresponding to a difference between the oscillating magnetic field at the first location and the oscillating magnetic field at the second location, wherein changes in said output signal are indicative of discontinuities in the string of tubular goods.

23. The tool of claim 22, wherein each of the first and second receivers comprises a coil having a plurality of turns of insulated wire, and wherein the receiver coil that is located farthest from the transmitter coil has more turns of insulated wire than does the receiver coil that is located closer to the transmitter coil.

24. The tool of claim 22, wherein the oscillating field has a frequency between 8 and 128 cycles per second.

25. The tool of claim 22, wherein the difference between the oscillating magnetic field at the first location and the oscillating magnetic field at the second location is a phase difference.

26. The tool of claim 22, wherein the difference between the oscillating magnetic field at the first location and the oscillating magnetic field at the second location is an amplitude ratio.

* * * * *